United States Patent
Sato et al.

(10) Patent No.: US 12,552,901 B2
(45) Date of Patent: Feb. 17, 2026

(54) POLYARYLENE SULFIDE PRODUCTION METHOD

(71) Applicant: Kureha Corporation, Tokyo (JP)

(72) Inventors: Takeshi Sato, Tokyo (JP); Mizuki Saito, Tokyo (JP); Ken-ichi Takaki, Tokyo (JP); Yoshinori Suzuki, Tokyo (JP)

(73) Assignee: Kureha Corporation, Tokyo (JP)

( * ) Notice: Subject to any disclaimer, the term of this patent is extended or adjusted under 35 U.S.C. 154(b) by 605 days.

(21) Appl. No.: 17/999,159

(22) PCT Filed: Dec. 22, 2020

(86) PCT No.: PCT/JP2020/047916
§ 371 (c)(1),
(2) Date: Nov. 17, 2022

(87) PCT Pub. No.: WO2021/234992
PCT Pub. Date: Nov. 25, 2021

(65) Prior Publication Data
US 2023/0192958 A1    Jun. 22, 2023

(30) Foreign Application Priority Data

May 22, 2020    (JP) ................. 2020-089533

(51) Int. Cl.
*C08G 75/0231* (2016.01)
*C08G 75/025* (2016.01)

(52) U.S. Cl.
CPC ....... *C08G 75/0231* (2013.01); *C08G 75/025* (2013.01)

(58) Field of Classification Search
CPC ............... C08G 75/0213; C08G 75/14; C08G 75/0263; C08G 75/0268; C08G 75/0259; C08G 75/025; B30B 9/28
See application file for complete search history.

(56) References Cited

U.S. PATENT DOCUMENTS

| | | | |
|---|---|---|---|
| 4,070,344 A | 1/1978 | Hergenrother et al. | |
| 5,688,908 A | 11/1997 | Haubs et al. | |
| 6,201,098 B1 | 3/2001 | Haubs et al. | |
| 6,350,852 B1 | 2/2002 | Haubs et al. | |
| 10,647,818 B2 | 5/2020 | Konno et al. | |
| 2006/0122363 A1 | 6/2006 | Hayashi | |
| 2011/0081591 A1 | 4/2011 | Scherer et al. | |
| 2012/0065361 A1* | 3/2012 | Konno | C08G 75/0259 528/368 |
| 2013/0022808 A1 | 1/2013 | Taniguchi et al. | |
| 2016/0244569 A1* | 8/2016 | Chiong | C08G 75/025 |
| 2018/0171078 A1 | 6/2018 | Kimura et al. | |
| 2018/0340043 A1 | 11/2018 | Konno et al. | |
| 2019/0016915 A1 | 1/2019 | Schaefer et al. | |
| 2019/0144724 A1 | 5/2019 | Dollase et al. | |

FOREIGN PATENT DOCUMENTS

| | | |
|---|---|---|
| CN | 1144227 A | 3/1997 |
| CN | 101010705 A | 8/2007 |
| CN | 101516959 A | 8/2009 |
| CN | 101568555 A | 10/2009 |
| CN | 101855250 A | 10/2010 |
| CN | 102067368 A | 5/2011 |
| CN | 104768997 A | 7/2015 |
| CN | 107001849 A | 8/2017 |
| CN | 109219635 A | 1/2019 |
| EP | 1837359 A1 | 9/2007 |
| JP | 2004-123958 A | 4/2004 |
| JP | 2016-108488 A | 6/2016 |
| JP | 2016-128539 A | 7/2016 |
| KR | 20170054534 A | 5/2017 |
| KR | 20180004229 A | 1/2018 |
| WO | 2006025949 A2 | 3/2006 |
| WO | 2006/068159 A1 | 6/2006 |
| WO | 2008006945 A1 | 1/2008 |
| WO | 2008082511 A1 | 7/2008 |
| WO | 2009035579 A1 | 3/2009 |

(Continued)

OTHER PUBLICATIONS

Office Action for CN202080100044.5, mailed on Nov. 29, 2023, 8 pages.
English translation of Office Action for CN202080100044.5, mailed on Nov. 29, 2023, 7 pages.
Notification of Reasons for Refusal for JP2022-524872, mailed on Aug. 29, 2023, 3 pages.

(Continued)

*Primary Examiner* — Shane Fang
(74) *Attorney, Agent, or Firm* — Abel Schillinger, LLP

(57) ABSTRACT

A method for producing polyarylene sulfide that can have a high melt viscosity while suppressing ultra-fine powder generation. The method for producing polyarylene sulfide includes: (1) preparing a prepared mixture containing an organic polar solvent, a sulfur source, and a dihalo aromatic compound; (2) initiating a polymerization reaction by heating the prepared mixture to produce a prepolymer; (3) adding water as a phase separation agent to a reaction mixture in a reaction system to form a phase-separated state; and (4) continuing the polymerization reaction after phase separation. In the method, when a dihalo aromatic compound conversion ratio is 80 mass % or greater and 93 mass % or less and after the prepolymer reaches a weight average molecular weight of 10000 or greater in the first-stage polymerization step, an aromatic compound having 3 or more halogen atoms bonded to an aromatic ring is added to the reaction mixture.

6 Claims, No Drawings

(56) References Cited

FOREIGN PATENT DOCUMENTS

WO     2011/125480 A1    10/2011
WO     2014074567 A1    5/2014

OTHER PUBLICATIONS

English translation of Notification of Reasons for Refusal for JP2022-524872, mailed on Aug. 29, 2023, 5 pages.

* cited by examiner

POLYARYLENE SULFIDE PRODUCTION METHOD

TECHNICAL FIELD

The present invention relates to a method for producing a polyarylene sulfide.

BACKGROUND ART

A polyarylene sulfide (hereinafter, also referred to as "PAS"), represented by polyphenylene sulfide (hereinafter, also referred to as "PPS"), is an engineering plastic having excellent heat resistance, chemical resistance, flame retardancy, mechanical strength, electrical characteristics, dimensional stability, and the like. PAS can be formed into various molded products, films, sheets, fibers, and the like by ordinary melt processing methods, such as extrusion molding, injection molding, and compression molding. For this reason, PAS has been widely used in a wide range of technical fields such as electric devices, electronic devices, devices for automobiles, and packaging materials.

When a PAS resin is formed into a molded product as described above, burrs are sometimes formed. To suppress formation of such burrs, PAS having a high melt viscosity has been used as a burr suppressing agent.

In production of such PAS having a high melt viscosity, generation of a large amount of ultra fine powder as a waste has been problematic. If an amount of the waste is large, time and cost for the treatment of waste are required, and thus productivity of the PAS deteriorates. Thus, a method for producing a branched PAS which can reduce the amount of generated ultra fine powder as a waste has been demanded.

As the method for producing PAS that can resolve the problem of generation of ultra fine powder, proposed is a method for producing polyarylene sulfide, including the following steps (1) to (3):

(1) a preparation step of preparing a prepared mixture containing an organic amide solvent, a sulfur source, water, and a dihalo aromatic compound;

(2) a first-stage polymerization step of performing a polymerization reaction of the prepared mixture at a temperature from 170 to 280° C. to produce a prepolymer having a conversion ratio of the dihalo aromatic compound of 50% or greater; and (3) a second-stage polymerization step of continuing the polymerization reaction in a phase-separated state at a temperature from 245 to 290° C. in a reaction system containing the prepolymer, the method including adding a polyfunctional compound to the reaction system in the phase-separated state, (see Patent Document 1).

CITATION LIST

Patent Document

Patent Document 1: JP 2016-128539 A

SUMMARY OF INVENTION

Technical Problem

However, according to the study of the present inventors, it was found that the known production methods described in Patent Document 1 and the like have problems of difficulty in producing PAS having a high melt viscosity even though the generation of ultra fine powder can be suppressed.

The present invention was completed in light of the problems described above, and an object of the present invention is to provide a method for producing PAS that can produce PAS having a high melt viscosity while generation of ultra fine powder is suppressed.

Solution to Problem

The present inventors found that the object is accomplished by a method for producing PAS, including: (1) a preparation step of preparing a prepared mixture containing an organic polar solvent, a sulfur source, and a dihalo aromatic compound; (2) a first-stage polymerization step of initiating a polymerization reaction by heating the prepared mixture to produce a prepolymer; (3) a phase separation step of adding water as a phase separation agent to a reaction mixture in a reaction system to form a phase-separated state; and (4) a second-stage polymerization step of continuing the polymerization reaction after the phase separation step; when a conversion ratio of the dihalo aromatic compound is greater than 80 mass % and 93 mass % or less and after a weight average molecular weight of the prepolymer reaches 10000 or greater in the first-stage polymerization step, a polyhaloaromatic compound being added to the reaction mixture, and thus completed the present invention.

The method for producing PAS according to an embodiment of the present invention is a method for producing polyarylene sulfide including:

(1) a preparation step of preparing a prepared mixture containing an organic polar solvent, a sulfur source, and a dihalo aromatic compound;

(2) a first-stage polymerization step of initiating a polymerization reaction by heating the prepared mixture to produce a prepolymer;

(3) a phase separation step of adding a phase separation agent to a reaction mixture in a reaction system to form a phase-separated state; and (4) a second-stage polymerization step of continuing the polymerization reaction after the phase separation step;

when a conversion ratio of the dihalo aromatic compound is greater than 80 mass % and 93 mass % or less and after a weight average molecular weight of the prepolymer reaches 10000 or greater in the first-stage polymerization step, an aromatic compound having 3 or more halogen atoms bonded to an aromatic ring being added to the reaction mixture in the reaction system.

In the method for producing PAS according to an embodiment of the present invention, an amount of the organic polar solvent in the prepared mixture supplied to the first-stage polymerization step may be 500 g or less with respect to 1 mol of the sulfur source.

In the method for producing PAS according to an embodiment of the present invention, an amount of the polyhaloaromatic compound added in the first-stage polymerization step may be from 0.010 to 0.050 mol with respect to 1 mol of the sulfur source.

In the method for producing PAS according to an embodiment of the present invention, water and an organic carboxylic acid metal salt may be used in combination as the phase separation agent.

In the method for producing PAS according to an embodiment of the present invention, a mass of the water as the phase separation agent may be 10 times or greater and 50 times or less a mass of the organic carboxylic acid metal salt.

In the method for producing PAS according to an embodiment of the present invention, a mass of the water as the phase separation agent is 20 times or greater and 30 times or less a mass of the organic carboxylic acid metal salt.

Advantageous Effects of Invention

According to an embodiment of the present invention, a method for producing PAS that can produce PAS having a high melt viscosity while generation of ultra fine powder is suppressed can be provided.

DESCRIPTION OF EMBODIMENTS

An embodiment of the method for producing PAS according to the present invention is described hereinafter. The method for producing PAS in the present embodiment includes a preparation step, a polymerization step, a phase separation step, and a second-stage polymerization step as essential steps. As desired, the method for producing PAS in the present embodiment may include a water removal step, a cooling step, a post-treatment step, and other steps.

Each of the materials used in an embodiment of the present invention is described in detail below, and each step is also described in detail below.

Note that, in the specification and claims of the present application, "dihalo aromatic compound" means an aromatic compound in which two hydrogen atoms bonded directly to an aromatic ring are substituted with halogen atoms.
In the specification and claims of the present application, "polyhaloaromatic compound" means an aromatic compound having 3 or more halogen atoms bonded to an aromatic ring.
Organic Polar Solvent, Sulfur Source, and Dihalo Aromatic Compound The organic polar solvent, the sulfur source, and the dihalo aromatic compound are not particularly limited, and those typically used in production of PAS can be used. The organic polar solvent, the sulfur source, and the dihalo aromatic compound may each be used alone, or may each be used by mixing two or more types as long as the combination can produce PAS having a desired chemical structure.

Examples of the organic polar solvent include organic amide solvents; aprotic organic polar solvents formed from organosulfur compounds; and aprotic organic polar solvents formed from cyclic organophosphorus compounds. Examples of the organic amide solvent include amide compounds, such as N,N-dimethylformamide and N,N-dimethylacetamide; N-alkylcaprolactam compounds, such as N-methyl-ε-caprolactam; N-alkylpyrrolidone compounds or N-cycloalkylpyrrolidone compounds, such as N-methyl-2-pyrrolidone (hereinafter, also referred to as "NMP") and N-cyclohexyl-2-pyrrolidone; N,N-dialkylimidazolidinone compounds, such as 1,3-dialkyl-2-imidazolidinone; tetraalkyl urea compounds, such as tetramethyl urea; and hexaalkylphosphorus triamide compounds, such as hexamethylphosphorus triamide. Examples of the aprotic organic polar solvent formed from an organosulfur compound include dimethyl sulfoxide and diphenyl sulfone. Examples of the aprotic organic polar solvent formed from a cyclic organophosphorus compound include 1-methyl-1-oxophosphorane. Among them, from the viewpoint of availability, handleability, and the like, an organic amide solvent is preferable, an N-alkylpyrrolidone compound, an N-cycloalkylpyrrolidone compound, an N-alkylcaprolactam compound, and an N,N-dialkylimidazolidinone compound are more preferable, NMP, N-methyl-ε-caprolactam, and 1,3-dialkyl-2-imidazolidinone are still more preferable, and NMP is particularly preferable.

The amount of the organic polar solvent used is preferably from 1 to 30 mol, and more preferably from 3 to 15 mol, with respect to 1 mol of the sulfur source from the perspective of, for example, efficiency of the polymerization reaction.

Examples of the sulfur source include alkali metal sulfides, alkali metal hydrosulfides, and hydrogen sulfide. Alkali metal sulfides and alkali metal hydrosulfides are preferred, and alkali metal hydrosulfides are more preferred. The sulfur source can be handled, for example, in a state of any one of aqueous slurry or aqueous solution, and is preferably in a state of an aqueous solution from the perspective of handling such as measurability and transportability. Examples of the alkali metal sulfides include lithium sulfide, sodium sulfide, potassium sulfide, rubidium sulfide, and cesium sulfide. Examples of the alkali metal hydrosulfides include lithium hydrosulfide, sodium hydrosulfide, potassium hydrosulfide, rubidium hydrosulfide, and cesium hydrosulfide.

Examples of the dihalo aromatic compound include dihalo aromatic compounds such as o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide, and dihalodiphenyl ketone. The halogen atom refers to each atom of fluorine, chlorine, bromine, or iodine, and the two or more halogen atoms in the dihalo aromatic compound may be the same or different. Among these, from the viewpoints of availability, reactivity, and the like, the dihalo aromatic compound is preferably a p-dihalobenzene, a m-dihalobenzene, and a mixture of both, more preferably a p-dihalobenzene, and particularly preferably a p-dichlorobenzene (hereinafter also referred to as "pDCB").

The amount of the dihalo aromatic compound used is preferably from 0.90 to 1.50 mol, more preferably from 0.92 to 1.10 mol, and still more preferably from 0.95 to 1.05 mol, with respect to 1 mol of the amount of the charged sulfur source. When the used amount is in the range described above, decomposition reactions are less likely to occur, a stable polymerization reaction can be easily performed, and a high molecular weight polymer tends to be produced.
Water Removal Step The water removal step is a step of discharging at least a part of a distillate containing water from the inside of a system containing a mixture containing the organic polar solvent and the sulfur source to the outside of the system before the preparation step. The mixture subjected to the water removal step may contain an alkali metal hydroxide as necessary. The polymerization reaction of the sulfur source and the dihalo aromatic compound is affected, e.g., promoted or inhibited, by the amount of water present in the polymerization reaction system. Therefore, the water content of the polymerization reaction system is preferably reduced by performing the water removal treatment before the polymerization so that the water content does not inhibit the polymerization reaction.

In the water removal step, the water removal is preferably performed by heating in an inert gas atmosphere. Water to be removed in the water removal step includes water contained in the raw materials charged in the water removal step, an aqueous medium of the aqueous mixture, and water produced as a by-product by the reaction between the raw materials.

The heating temperature in the water removal step is not particularly limited and is preferably 300° C. or lower, and more preferably from 100 to 250° C. The heating time is preferably from 15 minutes to 24 hours, and more preferably from 30 minutes to 10 hours.

In the water removal step, the water removal is performed until the water content reaches a predetermined range. That is, in the water removal step, it is desirable to remove water until the water content in the prepared mixture (described later) reaches preferably from 0.5 to 2.4 mol with respect to 1.0 mol of the sulfur source (hereinafter, also referred to as a "charged sulfur source" or an "effective sulfur source"). When the water content is excessively small in the water removal step, water may be added to adjust the water content to a desired water content in the preparation step prior to the first-stage polymerization step.

Preparation Step

The preparation step is a step by which a mixture containing an organic polar solvent, a sulfur source, and a dihalo aromatic compound is prepared. The mixture prepared in the preparation step is also referred to as "prepared mixture".

In the case where the water removal step is performed, the amount of the sulfur source in the prepared mixture (hereinafter, also referred to as "amount of charged sulfur source" or "amount of effective sulfur source") can be calculated by subtracting the molar quantity of the hydrogen sulfide volatilized in the water removal step from the molar quantity of the sulfur source charged as the raw material.

In the case where the water removal step is performed, as necessary, in the preparation step, an alkali metal hydroxide and water can be added to the mixture remaining in the system after the water removal step. In particular, the alkali metal hydroxide can be added taking into account the amount of hydrogen sulfide produced during the water removal and the amount of the alkali metal hydroxide produced during the water removal. As the alkali metal hydroxide, those usually used in the production of PAS can be used. The alkali metal hydroxides may be used alone, or two or more types thereof may be used in mixture as long as the combination can produce PAS. Examples of the alkali metal hydroxide include lithium hydroxide, sodium hydroxide, potassium hydroxide, rubidium hydroxide, and cesium hydroxide. The number of moles of the alkali metal hydroxide is calculated based on the number of moles of the alkali metal hydroxide added as necessary in the preparation step, and when the water removal step is performed, the number of moles of the alkali metal hydroxide is calculated based on the number of moles of the alkali metal hydroxide added as necessary in the water removal step and the number of moles of the alkali metal hydroxide produced along with hydrogen sulfide in the water removal step. When the sulfur source contains an alkali metal sulfide, the number of moles of the alkali metal hydroxide per 1 mol of the sulfur source (charged sulfur source) is calculated in a manner that the number of moles of the alkali metal sulfide is included. When the sulfur source contains hydrogen sulfide, the number of moles of the alkali metal hydroxide per 1 mol of the sulfur source (charged sulfur source) is calculated in a manner that the number of moles of the produced alkali metal sulfide is included. However, the number of moles of the alkali metal hydroxide added for other purposes, such as the number of moles of the alkali metal hydroxide consumed in a reaction such as neutralization when an organic carboxylic acid metal salt is used as a phase separation agent in a form of a combination of an organic carboxylic acid and the alkali metal hydroxide, is not included in the number of moles of the alkali metal hydroxide per 1 mol of the sulfur source (charged sulfur source). Furthermore, when at least one acid selected from the group consisting of inorganic acids and organic acids is used for some reason or the like, the number of moles of the alkali metal hydroxide required to neutralize the at least one acid is not included in the number of moles of the alkali metal hydroxide per 1 mol of the sulfur source (charged sulfur source).

In the prepared mixture, the amount of each of the organic polar solvent and the dihalo aromatic compound used is set to, for example, the range shown in the above description related to the organic polar solvent and the dihalo aromatic compound with respect to 1 mol of the amount of the charged sulfur source.

Note that the amount of the organic polar solvent in the prepared mixture supplied to the first-stage polymerization step is preferably 500 g or less, more preferably 450 g or less, and particularly preferably 400 g or less, with respect to 1 mol of the sulfur source. The lower limit of the amount of the organic polar solvent in the prepared mixture is not particularly limited as long as the prepared mixture is allowed to favorably flow in the first-stage polymerization step. The lower limit of the amount of the organic polar solvent in the prepared mixture is, for example, preferably 200 g or greater, more preferably 250 g or greater, and even more preferably 300 g or greater, with respect to 1 mol of the sulfur source.

First-Stage Polymerization Step, Phase Separation Agent Addition Step, and Second-Stage Polymerization Step The first-stage polymerization step is a step of initiating polymerization reaction by heating the prepared mixture, to produce a prepolymer. In the first-stage polymerization step, the sulfur source and the dihalo aromatic compound are polymerized in the organic polar solvent to produce a prepolymer of PAS in an unbranched state. The mixture heated in the first-stage polymerization step and the second-stage polymerization step and the mixture in which the phase separation agent is added in the phase separation agent addition step and the mixture that is phase-separated in the phase separation agent addition step are referred to as the "reaction mixture".

To obtain PAS having a high molecular weight, the polymerization reaction can be performed in two or more separate stages. Specifically, the first-stage polymerization step described above and the second-stage polymerization step in which the polymerization reaction is continued in the presence of a phase separation agent are performed. The phase separation agent is added to the reaction mixture in the phase separation agent addition step provided between the first-stage polymerization step and the second-stage polymerization step.

When a conversion ratio of the dihalo aromatic compound is greater than 80 mass % and 93 mass % or less and after a weight average molecular weight of the prepolymer reaches 10000 or greater in the first-stage polymerization step, a polyhaloaromatic compound is added to the reaction mixture in the reaction system.

By adding the polyhaloaromatic compound as described above, PAS having a high melt viscosity can be produced while generation of ultra fine powder is suppressed.

The conversion ratio of the dihalo aromatic compound can be calculated by determining the amount of the dihalo aromatic compound remaining in the reaction mixture by gas chromatography and then performing a calculation based on the remaining amount of the dihalo aromatic compound, the amount of the dihalo aromatic compound charged, and the amount of the sulfur source charged.

In the present specification, the weight average molecular weight refers to a weight average molecular weight measured by gel permeation chromatography, calibrated with polystyrene.

Note that the reaction mixture containing a PAS prepolymer in an unbranched state can be obtained by performing the reaction of the first-stage polymerization step while conditions of the first-stage polymerization step are set in advance, and then cooling to approximately room temperature without adding TCB. With the use of this reaction mixture as a sample, the conversion ratio of the dihalo aromatic compound and the weight average molecular weight of the PAS measured by the methods described above can be used as the conversion ratio of the dihalo aromatic compound and the weight average molecular weight of the prepolymer at the time of the polyhaloaromatic compound addition.

As described above, by grasping the conversion ratio of the dihalo aromatic compound and the weight average molecular weight of the prepolymer in the first-stage polymerization step, timing of addition of the polyhaloaromatic compound can be decided in advance.

When a conversion ratio of the dihalo aromatic compound is greater than 80 mass % and 93 mass % or less and after a weight average molecular weight of the prepolymer reaches 10000 or greater in the first-stage polymerization step, the polyhaloaromatic compound is added to the reaction mixture in the reaction system.

In particular, from the perspectives of favorably suppressing generation of ultra fine powder and ease in producing PAS having a high melt viscosity, the conversion ratio of the dihalo aromatic compound at the time of addition of the polyhaloaromatic compound is preferably 83 mass % or greater, more preferably 86 mass % or greater, and even more preferably 90 mass % or greater.

The polyhaloaromatic compound can be added to the reaction mixture as a powder, melt, solution, or dispersion. When the polyhaloaromatic compound is added as a solution or a dispersion, the organic polar solvent described above can be preferably used as a solvent or a dispersion medium.

The polyhaloaromatic compound is an aromatic compound having 3 or more halogen atoms bonded to an aromatic ring. Examples of the halogen atoms include fluorine, chlorine, bromine, and iodine. The three or more halogen atoms in the polyhaloaromatic compound may be the same or different. The number of the halogen atoms bonded to an aromatic ring in the polyhaloaromatic compound is not particularly limited as long as the number is 3 or greater, and is preferably an integer from 3 to 5, more preferably from 3 or 4, and particularly preferably 3. One type of the polyhaloaromatic compound may be used alone, or two or more types of the polyhaloaromatic compounds may be used in combination.

Suitable specific examples of the polyhaloaromatic compound added to the reaction mixture in the first-stage polymerization step include polyhaloaromatic compounds having 3 or more halogen substitutions, such as 1,2,3-trichlorobenzene, 1,2,4-trichlorobenzene, 1,3,5-trichlorobenzene, hexachlorobenzene, 1,2,3,4-tetrachlorobenzene, 1,2,4,5-tetrachlorobenzene, 1,3,5-trichloro-2,4,6-trimethylbenzene, 2,4,6-trichlorotoluene, 1,2,3-trichloronaphthalene, 1,2,4-trichloronaphthalene, 1,2,3,4-tetrachloronaphthalene, 2,2',4,4'-tetrachlorobiphenyl, 2,2',4,4'-tetrachlorobenzophenone, and 2,4,2'-trichlorobenzophenone.

From the perspectives of the reactivity with an oligomer or prepolymer and, for example, degree of polymerization (melt viscosity) and yield of the resulting PAS, 1,2,4-trichlorobenzene is particularly preferred as the polyhaloaromatic compound. Hereinafter, 1,2,4-trichlorobenzene may be written as TCB.

The amount of the polyhaloaromatic compound added in the first-stage polymerization step is preferably from 0.005 to 0.200 mol, more preferably from 0.005 to 0.150 mol, even more preferably from 0.005 to 0.100 mol, yet even more preferably from 0.010 to 0.100 mol, and particularly preferably from 0.010 to 0.050 mol, with respect to 1 mol of the sulfur source. When the amount of the polyhaloaromatic compound with respect to 1 mol of the sulfur source is too small, the PAS may not be obtained in high yield. When the amount of the polyhaloaromatic compound is too large, due to increase in production cost and excessive progression of crosslinking reaction, the average particle size of granular PAS becomes small, and the amount of the PAS that can be recovered as a product may decrease.

In the first-stage polymerization step and the second-stage polymerization step, the polymerization reaction is preferably performed under heating at a temperature from 170 to 300° C. from the viewpoint of efficiency of the polymerization reaction and the like. The polymerization temperature in the first-stage polymerization step and the second-stage polymerization step is more preferably in a range from 180 to 290° C. in order to suppress side reactions and decomposition reactions. In particular, in the first-stage polymerization step, from the perspective of the efficiency of the polymerization reaction and the like, it is preferable to initiate the polymerization reaction under heating at a temperature from 170 to 270° C. to produce a prepolymer having a weight average molecular weight of 10000 or greater while the conversion ratio of the dihalo aromatic compound is greater than 80 mass % and 93 mass % or less. The polymerization temperature in the first-stage polymerization step is preferably selected from a range from 180 to 265° C. in order to suppress side reactions and decomposition reactions.

In the second-stage polymerization step following the first-stage polymerization step, a degree of polymerization of the prepolymer is increased. In the second-stage polymerization step, the reaction system containing the prepolymer produced in the first-stage polymerization step described above is heated to continue the polymerization reaction in the phase-separated state. The polymerization temperature in the second-stage polymerization step is typically preferably higher than the polymerization temperature of the first-stage polymerization step. The polymerization temperature of the second-stage polymerization step is preferably from 240 to 290° C., more preferably from 250 to 280° C., and even more preferably from 255 to 275° C. When the polymerization temperature in the second-stage polymerization step is too low, the phase separation does not occur. Thus, a PAS having a high degree of polymerization is unlikely to be obtained. When the polymerization temperature is too high, the produced PAS and the organic polar solvent may be decomposed. The polymerization temperature is preferably maintained at a constant temperature. If necessary, the polymerization temperature may be increased or decreased stepwise or continuously in the second-stage polymerization step.

Due to the presence of the phase separation agent, the polymerization reaction system (reaction mixture) is phase-separated into the concentrated polymer phase (phase having high polymer concentration in the organic amide solvent) and the dilute polymer phase (phase having low polymer concentration in the organic amide solvent) in the second-stage polymerization step. The phase separation may occur in the middle of the second-stage polymerization step by adjusting the timing of addition of the phase separation agent, adjusting the polymerization temperature, or the like.

The phase separation agent is preferably water from the perspective of ease in forming a favorable phase-separated state. In the phase separation agent addition step, a phase separation agent other than water can be used. A single type of the phase separation agent other than water may be used alone, or the phase separation agent may be used together with water. The phase separation agent is preferably used together with water. The phase separation agent other than water is not particularly limited. Examples of the phase separation agent other than water include at least one selected from the group consisting of organic carboxylic acid metal salts (for example, an alkali metal salt of an aliphatic carboxylic acid, such as sodium acetate, an alkaline earth metal salt of an aromatic carboxylic acid, and the like), organic sulfonic acid metal salts, alkali metal halides, alkaline earth metal halides, alkali metal phosphates, alcohols, and nonpolar solvents. The salts used as the phase separation agent may each be in a form obtained by separately adding corresponding acid and base.

From the perspective of high suppression effect of generation of ultra fine powder, water and an organic carboxylic acid metal salt are preferably used in combination as the phase separation agent, and water and sodium acetate are more preferably used in combination.

When water and the organic carboxylic acid metal salt are used in combination, the mass of water as the phase separation agent is preferably 10 times or greater and 50 times or less, and more preferably 20 times or greater and 30 times or less the mass of the organic carboxylic acid metal salt.

The amount of the phase separation agent used varies depending on the type of compounds used but may be in a range from 0.01 to 20 mol with respect to 1 kg of the organic polar solvent. When water is used as the phase separation agent, the amount of the water used as the phase separation agent is preferably 2 or greater and 10 mol or less, more preferably 2.1 mol or greater and 7 mol or less, and even more preferably 2.2 mol or greater and 5 mol or less, with respect to 1 mol of the sulfur source.

In the second-stage polymerization step, the amount of the alkali metal hydroxide is preferably from 1.00 to 1.10 mol, more preferably from 1.01 to 1.08 mol, and still more preferably from 1.02 to 1.07 mol, with respect to 1 mol of the sulfur source. When the amount of the alkali metal hydroxide is within the above range, the molecular weight of PAS obtained is more likely to increase, and higher molecular weight PAS is more likely to be obtained. In the second-stage polymerization step, the alkali metal hydroxide is preferably added to the reaction mixture based on the amount of the alkali metal hydroxide present in the reaction mixture after the first-stage polymerization step, so that a final amount of the alkali metal hydroxide is within the above range.

The polymerization reaction in the first-stage polymerization step and the second-stage polymerization step may be carried out batch-wise or continuously. For example, the polymerization reaction can be continuously performed by simultaneously performing in parallel at least the supply of the organic polar solvent, the sulfur source, and the dihalo aromatic compound, the production of PAS by the reaction of the sulfur source and the dihalo aromatic compound in the organic polar solvent, and the collection of the reaction mixture containing PAS.

Post-Treatment Step and Recovering Step

The PAS produced by the method described above is typically recovered through post-treatment step and recovering step. The post-treatment step and the recovering step can be performed by ordinary methods. For example, by cooling the reaction mixture after the second-stage polymerization step, a slurry containing a granular polymer product can be obtained. The cooled product slurry is diluted as it is with water or the like and separated by filtration, then washed and filtered repeatedly, and dried. Thus, PAS can be recovered.

Because of production of the granular PAS by the method described above, for example, the granular PAS can be separated from the reaction solution by a method of sieving using a screen. Consequently, the PAS can be easily separated from, for example, by-products and oligomers. The granular PAS may be passed through a sieve while the product slurry is at a high temperature. Specifically, the granular PAS which is separated with a 100-mesh (opening diameter: 150 μm) screen (also referred to as "100 mesh-on") can be recovered as a product.

The granular PAS recovered from the product slurry as described above is preferably washed with an organic solvent, such as the organic polar solvents described above, ketones (e.g., acetone), and alcohols (e.g., methanol). The granular PAS may be washed with high temperature water or the like. The granular PAS may be also treated with an acid or a salt such as ammonium chloride.

The product which passes through the 100-mesh (opening diameter: 150 μm) screen (also referred to as "100 mesh-pass") described above is also subjected to a treatment such as washing in the same manner as described, and then sieved with a 400-mesh (opening diameter: 38 μm) screen (also referred to as "400 mesh-on") to recover a fine powder having a size of 100 mesh-pass and 400 mesh-on and an ultra fine powder having a size of 400 mesh-pass.

The fine powder is granular PAS that is not recovered as a product due to its small particle size and is formed from the PAS having the same level of molecular weight as that of the granular PAS recovered as the product. The particle sizes of most of the particles of the fine powder are in a range of 38 μm or greater and less than 150 μm.

The ultra fine powder is granular PAS that is not recovered as a product due to its small particle size and is formed from PAS having a low molecular weight due to effect of side reactions. The particle sizes of most of the particles of the ultra fine powder are less than 38 μm.

The ultra fine powder includes oligomer components. The composition of the ultra fine powder is thus complex. Therefore, when the ultra fine powder is detoxified and disposed, large cost is required.

Since the amounts of the fine powder and the ultra fine powder, and in particular, the amount of the ultra fine powder to be produced are decreased, the present invention exerts an effect of contributing to the environmental problems and decreasing the cost of industrial waste treatment due to decrease in industrial waste.

In the method for producing PAS of the present embodiment, PAS is not particularly limited and is preferably PPS.

The present invention is not limited to the embodiments described above, and various modifications are possible. Embodiments obtained by appropriately combining the technical means disclosed by the specification of the present application are also included in the technical scope of the present invention. In addition, all of the documents described in the specification of the present application are herein incorporated by reference.

EXAMPLES

The present invention will be more specifically described hereinafter with reference to examples and comparative examples. Measurement methods for various types of characteristics, physical properties, and the like are as shown below.

(1) Melt Viscosity

The melt viscosity of the polymer was measured by a Capirograph 1-C available from Toyo Seiki Seisaku-sho, Ltd., using about 20 g of a dried polymer. At this time, a die having a diameter of 2.095 mm and a length of 8.04 mm and having a fluid inlet angle was used as the capillary, and the temperature was set to 330° C. The polymer sample was introduced into the instrument, and after the sample was held for 5 minutes, the melt viscosity at a shear rate of 2 sec$^{-1}$ was measured (unit: Pa·s).

(2) Average Particle Size

The average particle size of the polymer was measured by a sieving method for polymer particles having a size of 100 mesh-on (opening diameter: 150 μm) using 7-mesh (opening diameter: 2800 μm), 12-mesh (opening diameter: 1410 μm), 16-mesh (opening diameter: 1000 μm), 24-mesh (opening diameter: 710 μm), 32-mesh (opening diameter: 500 μm), 60-mesh (opening diameter: 250 μm), and 80-mesh (opening diameter: 180 μm) sieves.

(3) Recovery Amount of Ultra Fine Powder

In a recovery step, a product passing through a 100-mesh (opening diameter: 150 μm) screen was sieved with a 400-mesh (opening diameter: 38 μm) screen to recover an ultra fine powder having a size of 400 mesh-pass. The amount thereof was measured. Based on the measured mass of the ultra fine powder and the mass of all the recovered polymer, the ratio of the mass of the ultra fine powder with respect to the mass of all the recovered polymer was calculated.

Example 1

1. Water Removal Step:

As a sulfur source, a sodium hydrosulfide (NaSH) aqueous solution was used. A 20-L autoclave (reactor) made of titanium was charged with 6000 g of N-methyl-2-pyrrolidone (hereinafter, abbreviated as "NMP"), 2010 g of 62.53 mass % sodium hydrosulfide aqueous solution, and 1146 g of 73.21 mass % sodium hydroxide aqueous solution. The sulfur source composed of sodium hydrosulfide and sodium sulfide was represented by "S". The molar ratio (mol/mol) of sodium hydroxide to the sulfur source (NaOH/S) was 0.937.

The reactor was purged with nitrogen gas. Thereafter, the temperature of the reactor was gradually increased to 200° C. over about 3 hours under stirring at a rotational speed of a stirrer of 250 rpm. Thus, 906 g of water ($H_2O$), 808 g of NMP, and 13.53 g (0.40 mol) of hydrogen sulfide ($H_2S$) were distilled.

2. Preparation Step:

After the water removal step, the temperature of the reactor was cooled to 150° C., and 3467 g of p-dichlorobenzene (hereinafter, abbreviated as "pDCB"), 2839 g of NMP, 8 g of sodium hydroxide having a purity of 97%, and 68 g of water were added to prepare a prepared mixture. At that time, the temperature in the reactor was decreased to 140° C. The ratio of NMP/S (g/mol) in the reactor was 365, the ratio of pDCB/S (mol/mol) was 1.072, the ratio of of $H_2O/S$ (mol/mol) was 1.50, and the ratio of NaOH/S (mol/mol) was 1.00.

3. Polymerization Step:

First-Stage Polymerization Step

While the prepared mixture was stirred by rotating a stirrer provided in the reactor at 250 rpm, the temperature was increased to 220° C. The reaction was performed at 220° C. for 1 hour, and then the reaction was performed at 230° C. for 1.5 hours. At the time when the reaction was performed at 230° C. for 1.5 hours, 1,2,4-trichlorobenzene (TCB) was added to the reaction mixture in a manner that the ratio TCB/S of the number of moles of TCB to the number of moles of the sulfur source (S) was 0.03 mol/mol. After the addition of TCB, 770 g of NMP was added. After the addition of NMP, the reaction was further performed at 230° C. for 0.25 hours.

The conversion ratio of pDCB at the time of TCB addition was 93 mass %. The conversion ratio was measured by the method described in the specification. The weight average molecular weight of the prepolymer at the time of TCB addition was 13000. The weight average molecular weight was measured by the method described in the specification.

Phase Separation Step and Second-Stage Polymerization Step

After the first-stage polymerization step, the rotational speed of the stirrer was increased to 400 rpm and, while the stirring was continued, 297 g of water in which 26 g of 97% sodium hydroxide was dissolved was injected as a phase separation agent [total water content in the reactor/NMP was 5.6 (mol/kg), total water content in the reactor/effective S was 2.25 (mol/mol), and NaOH/S was 1.029 (mol/mol)]. Then, the temperature of the reaction mixture was increased to 255° C., and the state of the reaction mixture became a phase-separated state. Thereafter, the temperature was maintained at 255° C., and the polymerization reaction was performed for 2 hours.

4. Post-Treatment Step:

After completion of the reaction, the reaction mixture was cooled to around room temperature, and the reaction solution was passed through a 100-mesh screen. Thus, a granular polymer was separated by sieving. The separated polymer was washed twice with acetone, then washed three times with water, washed with a 0.3% acetic acid aqueous solution, and washed four times with water to obtain a washed polymer. The washed polymer was dried at 105° C. for 13 hours. The granular PAS obtained as described above had a melt viscosity of 288000 Pa·s and an average particle size of 488 μm. Furthermore, the ratio of the ultra fine powder with respect to the total mass of the recovered PAS was 7.8 mass %.

Example 2

Granular PAS was obtained in the same manner as in Example 1 except for changing the production conditions to conditions listed in Table 1. The obtained granular PAS had a melt viscosity of 279000 Pa·s and an average particle size of 455 μm. Furthermore, the ratio of the ultra fine powder with respect to the total mass of the recovered PAS was 6.5 mass %.

Example 3

Granular PAS was obtained in the same manner as in Example 1 except for changing the production conditions to conditions listed in Table 1. The obtained granular PAS had a melt viscosity of 239000 Pa·s and an average particle size of 596 μm. Furthermore, the ratio of the ultra fine powder with respect to the total mass of the recovered PAS was 5.4 mass %.

Example 4

Granular PAS was obtained in the same manner as in Example 1 except for changing the production conditions to conditions listed in Table 1, and changing the reaction time at 230° C. in the first-stage polymerization to 1 hour 15 minutes. The obtained granular PAS had a melt viscosity of 248000 Pa·s and an average particle size of 978 μm. Furthermore, the ratio of the ultra fine powder with respect to the total mass of the recovered PAS was 10.8 mass %.

Comparative Example 1

Granular PAS was obtained in the same manner as in Example 1 except for changing the production conditions to conditions listed in Table 1. Note that, in the first-stage polymerization step, after the reaction was performed at 220° C. for 3 hours, TCB was added. After the addition of TCB, NMP was added. After the addition of NMP, the reaction was further continued at 230° C. for 0.25 hours. The obtained granular PAS had a melt viscosity of 207000 Pa·s and an average particle size of 1546 μm. Furthermore, the ratio of the ultra fine powder with respect to the total mass of the recovered PAS was 18.6 mass %.

Comparative Example 2

Granular PAS was obtained in the same manner as in Example 1 except for changing the production conditions to conditions listed in Table 1. Note that, in the first-stage polymerization step, the reaction was performed at 220° C. for 1 hour, and after the reaction was further performed at 230° C. for 2 hours, TCB was added. After the addition of TCB, NMP was added. After the addition of NMP, the reaction was further continued at 230° C. for 0.25 hours. The obtained granular PAS had a melt viscosity of 183000 Pa·s and an average particle size of 732 μm. Furthermore, the ratio of the ultra fine powder with respect to the total mass of the recovered PAS was 14.7 mass %.

TABLE 1

| | Example 1 | Example 2 | Example 3 | Example 4 | Comparative Example 1 | Comparative Example 2 |
|---|---|---|---|---|---|---|
| Prepared mixture | | | | | | |
| NMP/S (g/mol) | 365 | 365 | 365 | 380 | 365 | 365 |
| pDCB/S (mol/mol) | 1.072 | 1.077 | 1.077 | 1.077 | 1.090 | 1.070 |
| NaOH/S (mol/mol) | 1.000 | 1.000 | 1.000 | 1.000 | 1.000 | 1.000 |
| $H_2O$/S (mol/mol) | 1.5 | 1.5 | 1.5 | 1.5 | 1.5 | 1.5 |
| First-stage polymerization step | | | | | | |
| At the time of TCB addition pDCB conversion ratio (mass %) | 93 | 93 | 93 | 86 | 90 | 95 |
| At the time of TCB addition prepolymer weight average molecular weight | 13000 | 13000 | 13000 | 10200 | 9000 | 15500 |
| TCB added amount TCB/S (mol/mol) | 0.030 | 0.030 | 0.030 | 0.030 | 0.030 | 0.030 |
| Phase separation step | | | | | | |
| Water added amount water/S (mol/mol) | 2.25 | 2.7 | 2.7 | 2.7 | 2.25 | 2.25 |
| Sodium acetate added amount sodium acetate/S (mol/mol) | — | — | 0.1 | — | — | — |
| PAS | | | | | | |
| Average particle size (μm) | 488 | 455 | 596 | 978 | 1546 | 732 |
| Melt viscosity (Pa · s) | 288000 | 279000 | 239000 | 248000 | 207000 | 183000 |
| Ultra fine powder ratio (mass %) | 7.8 | 6.5 | 5.4 | 10.8 | 18.6 | 14.7 |

As is clear from Table 1, Examples, in which TCB, the polyhaloaromatic compound, was added to the reaction mixture when the conversion ratio of pDCB as the dihalo aromatic compound was greater than 80 mass % and 93 mass % or less and after the weight average molecular weight of the prepolymer reached 10000 or greater in the first-stage polymerization step, can produce PAS having a high melt viscosity and a small ratio of the ultra fine powder. On the other hand, Comparative Examples, in which TCB was added to the reaction mixture before the weight average molecular weight of the prepolymer reached 10000 or the conversion ratio of pDCB was outside the range of greater than 80 mass % and 93 mass % or less in the first-stage polymerization step, had difficulty in producing PAS having a high melt viscosity and a small ratio of the ultra fine powder.

The invention claimed is:

1. A method for producing polyarylene sulfide comprising:
   (1) a preparation step of preparing a prepared mixture containing an organic polar solvent, a sulfur source, and a dihalo aromatic compound;
   (2) a first-stage polymerization step of initiating a polymerization reaction by heating the prepared mixture to produce a prepolymer;
   (3) a phase separation step of adding a phase separation agent to a reaction mixture in a reaction system to form a phase-separated state; and
   (4) a second-stage polymerization step of continuing the polymerization reaction after the phase separation step; when a conversion ratio of the dihalo aromatic compound is greater than 80 mass % and 93 mass % or less and after a weight average molecular weight of the prepolymer reaches 10000 or greater in the first-stage polymerization step, an aromatic compound having 3 or more halogen atoms bonded to an aromatic ring being added to the reaction mixture in the reaction system; wherein an amount of the aromatic compound having 3 or more halogen atoms bonded to an aromatic ring added in the first-stage polymerization step is from 0.03 to 0.050 mol with respect to 1 mol of the sulfur source.

2. The method for producing polyarylene sulfide according to claim 1, wherein an amount of the organic polar solvent in the prepared mixture supplied to the first-stage polymerization step is 500 g or less with respect to 1 mol of the sulfur source.

3. The method for producing polyarylene sulfide according to claim 1, wherein water and an organic carboxylic acid metal salt are used in combination as the phase separation agent.

4. The method for producing polyarylene sulfide according to claim 3, wherein the organic carboxylic acid metal salt is sodium acetate.

5. The method for producing polyarylene sulfide according to claim 3, wherein a mass of the water as the phase separation agent is 10 times or greater and 50 times or less a mass of the organic carboxylic acid metal salt.

6. The method for producing polyarylene sulfide according to claim 3, wherein a mass of the water as the phase separation agent is 20 times or greater and 30 times or less a mass of the organic carboxylic acid metal salt.

* * * * *